2,961,431
Patented Nov. 22, 1960

2,961,431

COPOLYMER OF SODIUM ETHYLENESULFONATE AND N-VINYLPYRROLIDONE

Abraham Kutner, Newark, Del., assignor to Hercules Powder Company, Wilmington, Del., a corporation of Delaware No Drawing. Filed Dec. 4, 1958, Ser. No. 778,087

3 Claims. (Cl. 260—79.3)

This invention relates to a new polymeric material and more particularly to high viscosity, water-soluble copolymers of sodium ethylenesulfonate and N-vinylpyrrolidone and to the preparation of these polymers.

It is well known that sodium ethylenesulfonate can be homopolymerized to water-soluble polymers, but because of their relatively low molecular weight, they do not impart high viscosity to aqueous solutions and hence are of only limited utility. Attempts have been made to prepare copolymers of sodium ethylenesulfonate that would have higher viscosities and still retain water-solubility. Somewhat higher viscosity polymers have been achieved by copolymerizing sodium ethylenesulfonate with acrylamide. However, acrylamide has a much higher reactivity ratio than sodium ethylenesulfonate and hence enters the copolymer to a much greater degree than does the ethylenesulfonate. Thus, when equivalent weights of these monomers are copolymerized, the product contains about 95% acrylamide and only about 5% of the sodium ethylenesulfonate.

Now in accordance with this invention, it has been found that sodium ethylenesulfonate may be copolymerized with N-vinylpyrrolidone to produce high molecular weight, high viscosity water-soluble polymers and that it is possible to achieve copolymers of any desired composition by selecting the initial ratio of monomers. It was most unexpected to discover that by the combination of these two monomers it would be possible to produce a wide range of copolymers varying from high ethylenesulfonate content to high N-vinylpyrrolidone content and at the same time produce polymers having high viscosities. These polymers being polyelectrolytes with high molecular weights are useful in a wide variety of applications.

The copolymerization process of this invention is carried out by contacting a mixture of the two monomers in the desired ratio with a free-radical catalyst. Because of the ease of operation, the polymerization is generally carried out in an aqueous medium, although organic diluents such as aqueous methanol or ethanol may also be used. Any catalyst capable of liberating free radicals under the reaction conditions may be used to catalyze the copolymerization reaction. Exemplary of such free-radical catalysts are the organic and inorganic peroxides, organic hydroperoxides, azo catalysts, etc., such as benzoyl peroxide, acetyl peroxide, ascaridole, lauroyl peroxide, dicumyl peroxide, cumene hydroperoxide, tert-butyl hydroperoxide, potassium persulfate, azobis(isobutyronitrile), etc. The amount of the free-radical catalyst that is used to bring about the copolymerization reaction may be varied over a wide range but generally will be an amount of from about 0.1 to about 5% of the monomer weight. If desired, an activator may be used with the catalyst, as, for example, sodium bisulfite with potassium persulfate, etc.

The temperature at which the copolymerization is carried out will depend upon the type of catalyst used, the diluent, etc. Thus with the redox systems or the potassium persulfate-sodium bisulfite type of catalyst, relatively low temperatures may be used, as, for example, from about −10° C. to about +30° C. On the other hand, in the case of those catalysts that need to be heated to liberate the free radical, the temperature used will depend upon the decomposition temperature of the radical produced which is about 60° C. for azobis(isobutyronitrile), about 80° C. for benzoyl peroxide and about 130° C. for dicumyl peroxide, etc. Generally speaking, for such catalysts, a temperature of from about 45° C. to about 150° C. will be used.

The sodium salt of the ethylenesulfonic acid may be preformed or formed in situ from the free acid and, for example, sodium bicarbonate. The crude mixture of sodium ethylenesulfonate and inert salts obtained in the preparation of ethylenesulfonic acid may also be used.

Any concentration of the monomers may be used from a total of from about 5% to about 80% when water is used as the diluent but generally total monomer concentration will be from about 40% to about 60%. Higher concentrations may be used, but, if so, agitation of the polymerization reaction mixture will preferably also be used.

As pointed out above, a polymer of any desired ratio of the two monomers may be produced by varying the ratio of the monomers in the polymerization reaction. Thus, copolymers may be produced containing from about 1 to about 99% sodium ethylenesulfonate and 99 to 1% N-vinylpyrrolidone but for general utility will preferably contain from about 10% to about 90% sodium ethylenesulfonate and from about 90% to about 10% N-vinylpyrrolidone.

The following examples will illustrate the preparation of the new copolymers of this invention. All parts and percentages are by weight unless otherwise indicated.

Examples

In each of these examples a polymerization vessel was charged with a given amount of ethylenesulfonic acid, water, and sufficient sodium bicarbonate to neutralize the ethylenesulfonic acid, after which a given amount of N-vinylpyrrolidone and 0.1 part of azobis(isobutyronitrile) as catalyst were added. The polymerization vessel was flushed with nitrogen, alternately evacuated and pressured with nitrogen twice, leaving a nitrogen pressure in the vessel of 10 p.s.i. The polymerization vessel and contents were then heated at 60° C. and held at that temperature for 20 hours.

At the end of this period the solution in each case had thickened and the polymer was then isolated. The reaction mixture was dissolved in 100 parts of water, and this solution filtered to remove any insoluble matter. In the case of the copolymers containing 50 mole percent or more of N-vinylpyrrolidone (Examples 1–3), the polymer was isolated by pouring the aqueous solution into 500 parts of acetone. Failure of these polymers to precipitate in methanol indicated the absence of any sodium ethylenesulfonate homopolymer. In the case of the copolymers containing less than 50 mole percent of N-vinylpyrrolidone (Examples 4 and 5), the polymer was precipitated by pouring the aqueous solution into 600 parts of the mixture of acetone and methanol. The copolymer produced in each of these examples was insoluble in methanol indicating the absence of any N-vinylpyrrolidone homopolymer. The polymer was purified by again dissolving in water and reprecipitating in acetone.

In the following table are set forth the amounts of each of the ingredients used in each example along with the percent conversion to copolymer and the physical properties of the polymer, that is, specific viscosity, measured as a 1% solution in water, the analysis for sulfur and nitrogen and the mole ratio of sodium ethylenesulfonate to N-vinylpyrrolidone in the copolymer as indicated by the analysis. Also set forth are two control runs carried out under the same polymerization conditions, one on the homopolymerization of sodium ethylenesulfonate and the other on the homopolymerization of N-vinylpyrrolidone and the specific viscosity of the homopolymer so obtained.

| Example | Water, Parts | Ethylenesulfonic acid, parts | NaHCO₃, parts | Vinylpyrrolidone, parts | Mole Ratio,[1] NaEs:Vp | Polymer ||||| 
|---|---|---|---|---|---|---|---|---|---|---|
| | | | | | | Conversion, Percent | $\eta_{sp}$, 1% in $H_2O$ | Percent S | Percent N | Mole Ratio,[1] NaEs:Vp |
| Control | 5 | 2.16 | 1.85 | | | 59.5 | 0.11 | | | |
| Control | 15 | | | 8.88 | | 71.5 | 4.48 | | | |
| 1 | 15 | 2.16 | 1.85 | 8.88 | 1:4 | 88 | 7.2 | 4.39 | 8.48 | 1:4.4 |
| 2 | 10 | 2.16 | 1.85 | 4.44 | 1:2 | 77.5 | 4.68 | 9.38 | 6.71 | 1:1.7 |
| 3 | 12 | 4.32 | 3.7 | 4.44 | 1:1 | 89.5 | 1.84 | 11.9 | 5.02 | 1:1 |
| 4 | 17.5 | 8.64 | 7.4 | 4.44 | 2:1 | 53 | 1.01 | 14.45 | 3.70 | 1.7:1 |
| 5 | 10 | 8.64 | 7.4 | 2.22 | 4:1 | 80 | 0.71 | 19.1 | 2.20 | 4.2:1 |

[1] Mole ratio of sodium ethylenesulfonate to N-vinylpyrrolidone.

The above examples demonstrate the preparation of copolymers with varying mole ratios of the two monomers and at the same time the preparation of copolymers having widely varying viscosities as measured in water. Much higher viscosity copolymers may be prepared by varying the reaction conditions further, as, for example, by using a smaller amount of catalyst, lower temperature, etc. As will be readily appreciated by comparison with the control runs, these copolymers have much higher viscosities than the homopolymer of sodium ethylenesulfonate obtained under the same polymerization conditions. As a consequence, the copolymers of this invention have a high molecular weight coupled with a high fraction of electrolyte groups and hence are of much greater utility. These new copolymers are particularly useful for the control of water loss in oil well drilling muds, as water thickeners in cosmetics, creams and lotions, in the preparation of water-soluble films and in adhesives.

What I claim and desire to protect by Letters Patent is:

1. As a new composition of matter a copolymer of sodium ethylenesulfonate and N-vinylpyrrolidone.

2. The process of preparing a copolymer of sodium ethylenesulfonate and N-vinylpyrrolidone which comprises copolymerizing sodium ethylenesulfonate and N-vinylpyrrolidone by contacting a mixture of the two monomers with a free-radical catalyst in aqueous solution at a temperature of from about $-10°$ C. to about 150° C.

3. The process of preparing a copolymer of sodium ethylenesulfonate and N-vinylpyrrolidone which comprises copolymerizing sodium ethylenesulfonate and N-vinylpyrrolidone by contacting a mixture of the two monomers with a catalytic amount of azobis(isobutyronitrile) in aqueous solution at a temperature of from about 45° C. to 150° C.

References Cited in the file of this patent

UNITED STATES PATENTS

| | | |
|---|---|---|
| 2,300,920 | Heuer | Nov. 3, 1942 |
| 2,348,705 | Alderman | May 16, 1944 |
| 2,821,519 | Glickman | Jan. 28, 1958 |